July 14, 1953  E. A. CHANNER, JR  2,645,547
CABINET DESK AND SUPPORT THEREFOR
Filed Jan. 13, 1949
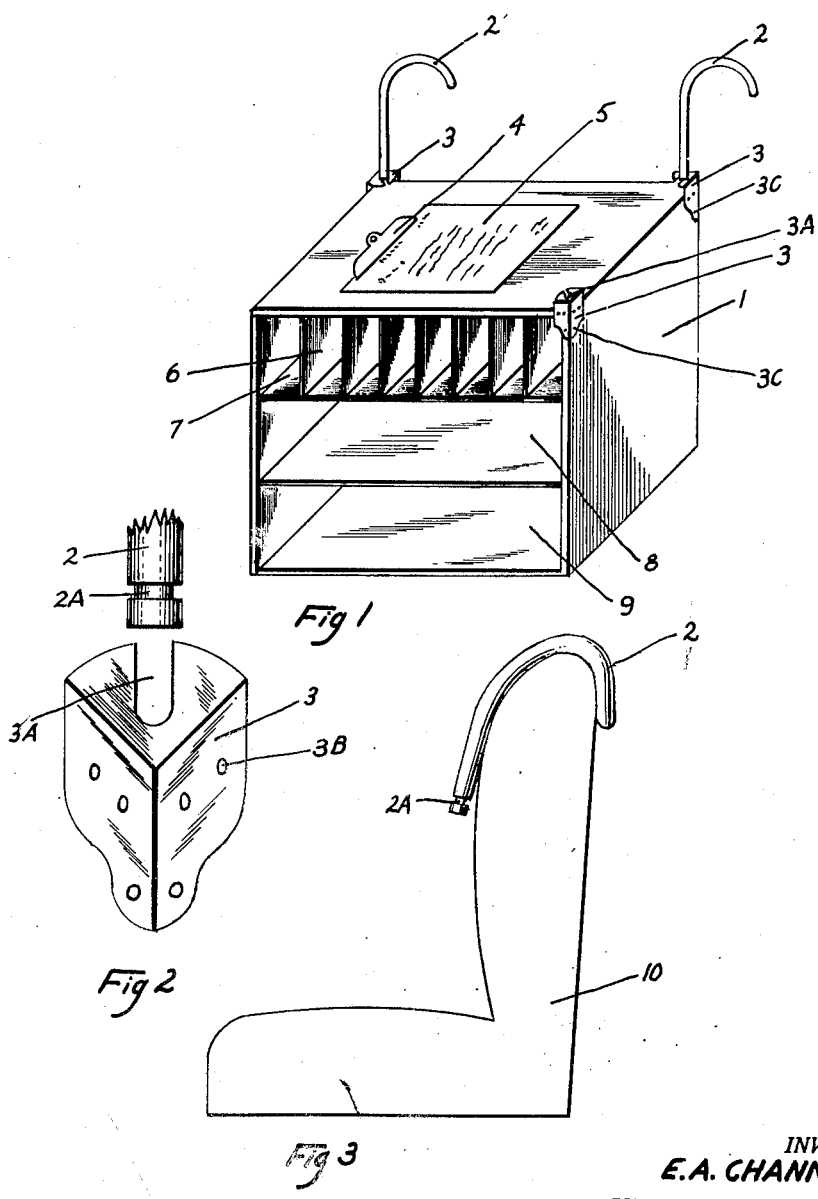
INVENTOR.
E.A. CHANNER JR.
BY David H. Eckroad
Attorney.

UNITED STATES PATENT OFFICE 2,645,547

CABINET DESK AND SUPPORT THEREFOR

Earle Adare Channer, Jr., Larchmont, N. Y.

Application January 13, 1949, Serial No. 70,623

1 Claim. (Cl. 312—245)

My invention relates to an article in the nature of a piece of furniture for use in an automobile, particularly by salesmen using automobiles in the pursuit of their occupation.

An object of my invention is to provide a device which I call a "caddy" for salesmen which provides for the keeping together and in one place, sales literature, etc., also provides a writing space, or a clip board, or both, on the top surface.

Another object of my invention is to provide such a device as described in preceding paragraph which can be installed in, or removed from an automobile in a few seconds and to be used particularly over front seat, however can be used on either front or back seat.

Another object of my invention is to provide such a device as described in preceding paragraphs which is simple and inexpensive in construction and serves as a very convenient accessory in any automobile for the uses specified.

Other objects and advantages in the use of the invention will become apparent by a reading of the description and a reference to the accompanying drawing, in which:

Fig. 1 is a perspective view of the complete invention or device.

Fig. 2 shows the metal corner plates and a segment, or lower end of the hook-shaped support.

Fig. 3 shows an outline of an automobile seat with the hook-shaped supports of the device in their supporting position on the back of an automobile seat.

Referring more in detail to the drawings:

Numeral 1 is the invention, or device; 2 are hook-shaped supports for hooking over back of an automobile seat as shown in Fig. 3, having a circular groove 2A or other means, near the lower end which engages in the slot 3A of 3 to hold the device in proper position on the seat of an automobile. Numeral 3 is a metal corner plate for fixing on the upper corners of the body of the device and having an open slot 3A to engage the circular groove 2A on 2 for the purpose stated. The corner plate has apertures 3C and 3B for fixing 3 to the body of 1 by means of screws, or other means. Numeral 4 is an ordinary spring clip for holding a clip board 5, for sales reports or other literature, 4 being attached to the top of the body of the device; 6 and 7 are open pigeon-holes for filing or holding small sized papers and 8 and 9 are shelf compartments for filing or holding larger sized papers or documents.

The installing of the device in an automobile is easily and quickly accomplished as follows:

The hook shaped supports 2 are placed over the back of an auto seat as shown in Fig. 3 and the body of the device is then attached to such supports by engaging the grooves 2A in the open slots 3A and is easily and quickly removed from an automobile by reversing the movements just stated. The corner plate may be fixed on three corners of the body of the device as shown in Fig. 1 so that the open part of the device may be at a right angle to, or parallel with, the back of the seat to which it is attached. In case the salesman who is driving his own car wishes to have direct access to the papers filed in the device, he can attach the device to the hook-like supports by means of the corner plates on the side of the body, in which case the open end of the device will be adjacent to the back of the seat to which it is attached and the open end of the device will be facing the driver-salesman, providing easy and direct access to the papers in the device.

The device may also be attached to the back of the front seat in an automobile, with the hook-like supports projecting down over the rear side of such seat for attaching to the body of the device, in which case the device may be used by a person seated on the rear seat of such automobile.

The hook-like supports of the device are preferably made of metal, or other suitable material and the body of wood, plastic aluminum, or any desirable and suitable material.

I wish it to be understood that various modifications may be necessary in the construction and form of the invention without departing from the basic features, or the spirit of the invention.

What I claim is:

A cabinet desk in the form of a rectilinear parallelepiped, having one open vertical side, supporting means for said cabinet comprising a notched plate attached to one upper corner of the cabinet with said plate parallel to and spaced from the top of the cabinet, a hook having a reduced portion and an enlargement or head portion on one end, said reduced portion being engageable in said notch to position said head portion between said plate and the top of the cabinet, a pair of plates similar to said aforesaid plate being similarly attached, respectively, to two other corners of said cabinet adjacent said first mentioned corner, a single second hook, identical in construction to said first mentioned hook, selectively engageable with one or the other of said pair of plates, and all of said hooks being rotatable with respect to their respectively associated plate.

EARLE ADARE CHANNER, Jr.

References Cited in the file of this patent

UNITED STATES PATENTS

| Number | Name | Date |
|---|---|---|
| 946,377 | Leonard | Jan. 11, 1910 |
| 957,324 | Gall | May 10, 1910 |
| 1,371,295 | Brigham | Mar. 15, 1921 |
| 1,564,989 | Weisberger | Dec. 8, 1925 |
| 2,184,047 | King | Dec. 19, 1939 |
| 2,316,833 | Baron | Apr. 20, 1943 |
| 2,521,572 | Eckel | Sept. 5, 1950 |